April 3, 1945.  J. D. B. PHIPPS  2,373,051
LIQUID-OPERATED CLASSIFIER
Filed June 21, 1944  10 Sheets-Sheet 5

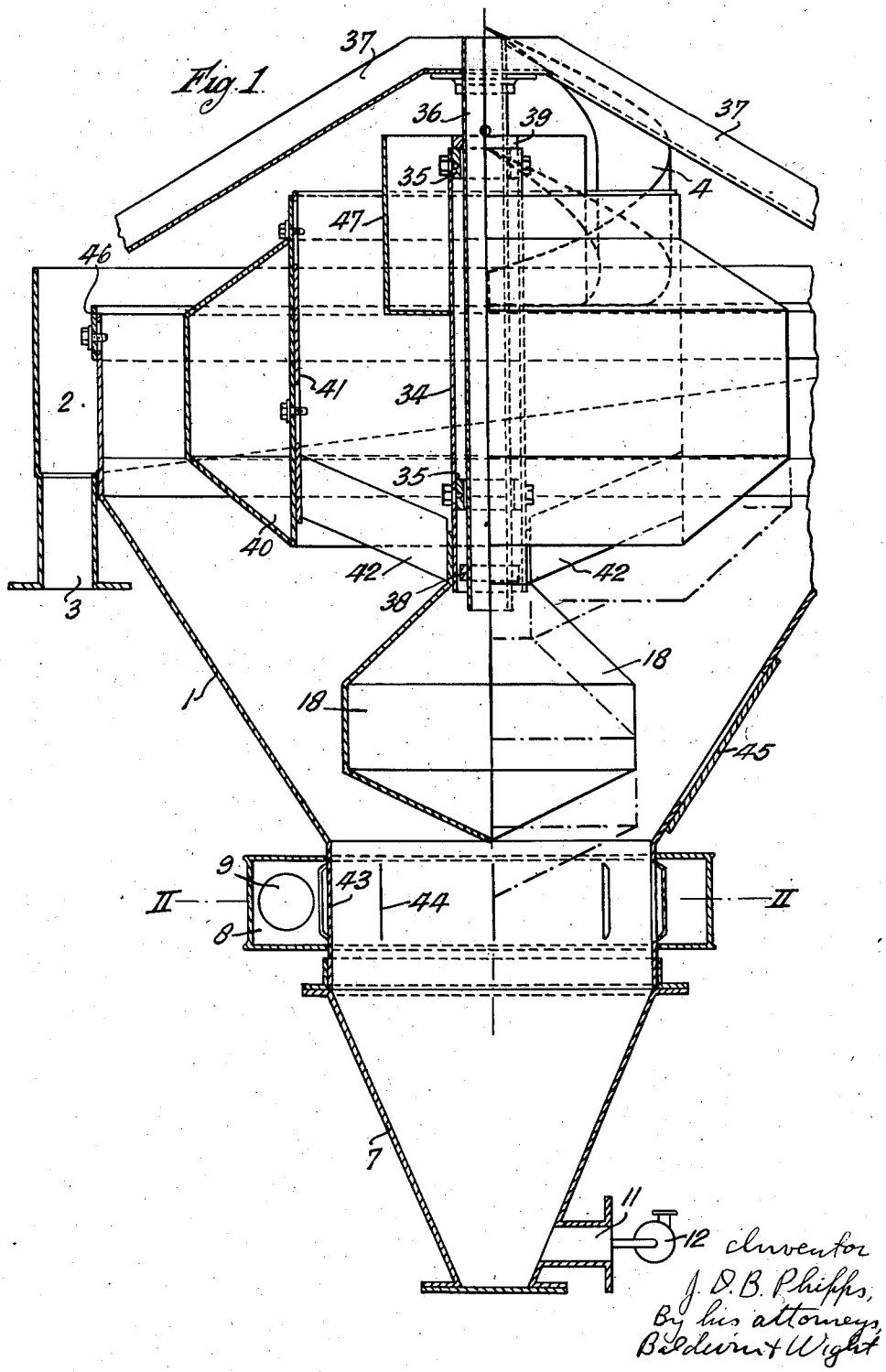

Inventor:
J. D. B. Phipps,
By his attorneys,
Baldwin + Wight

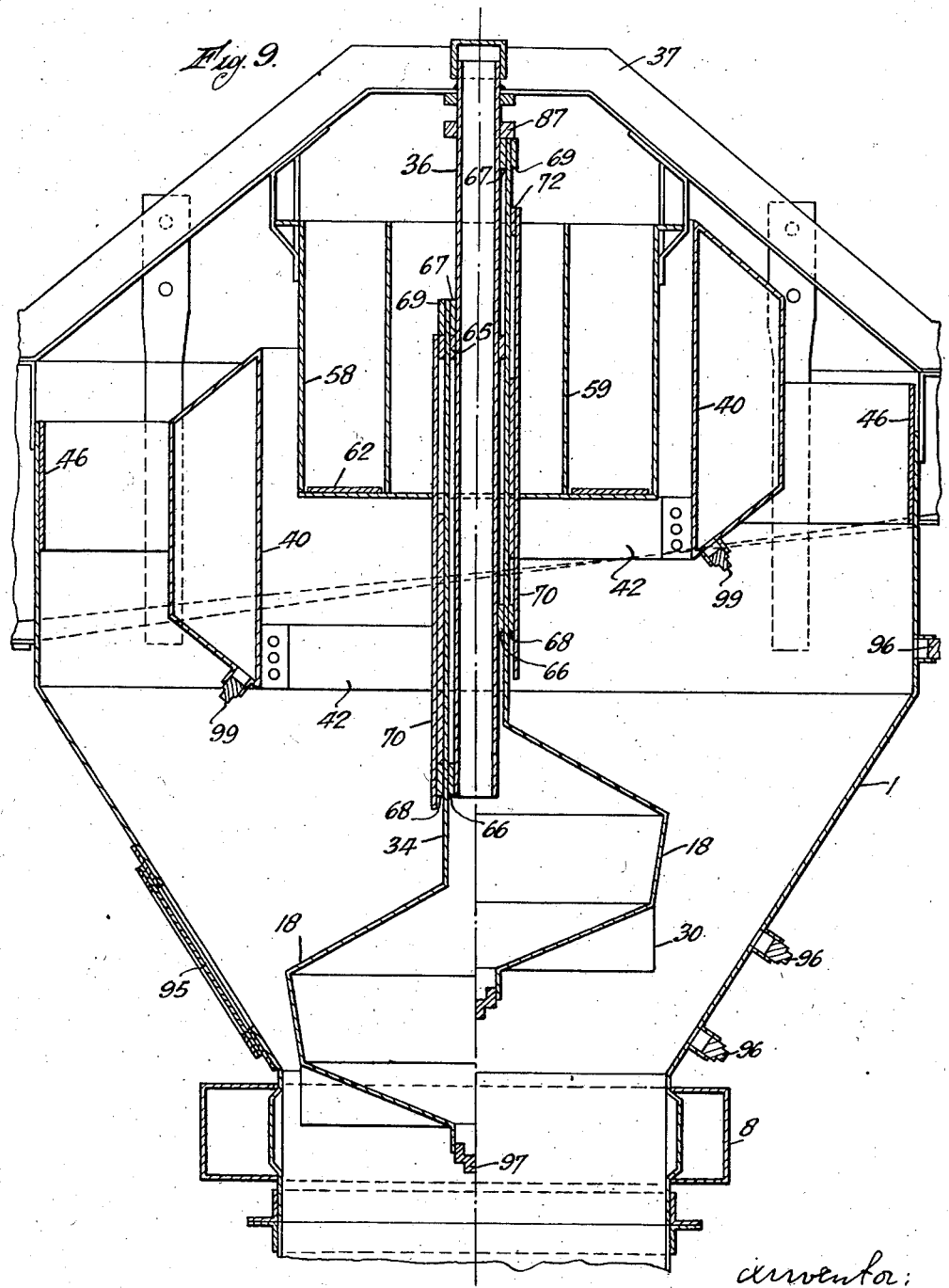

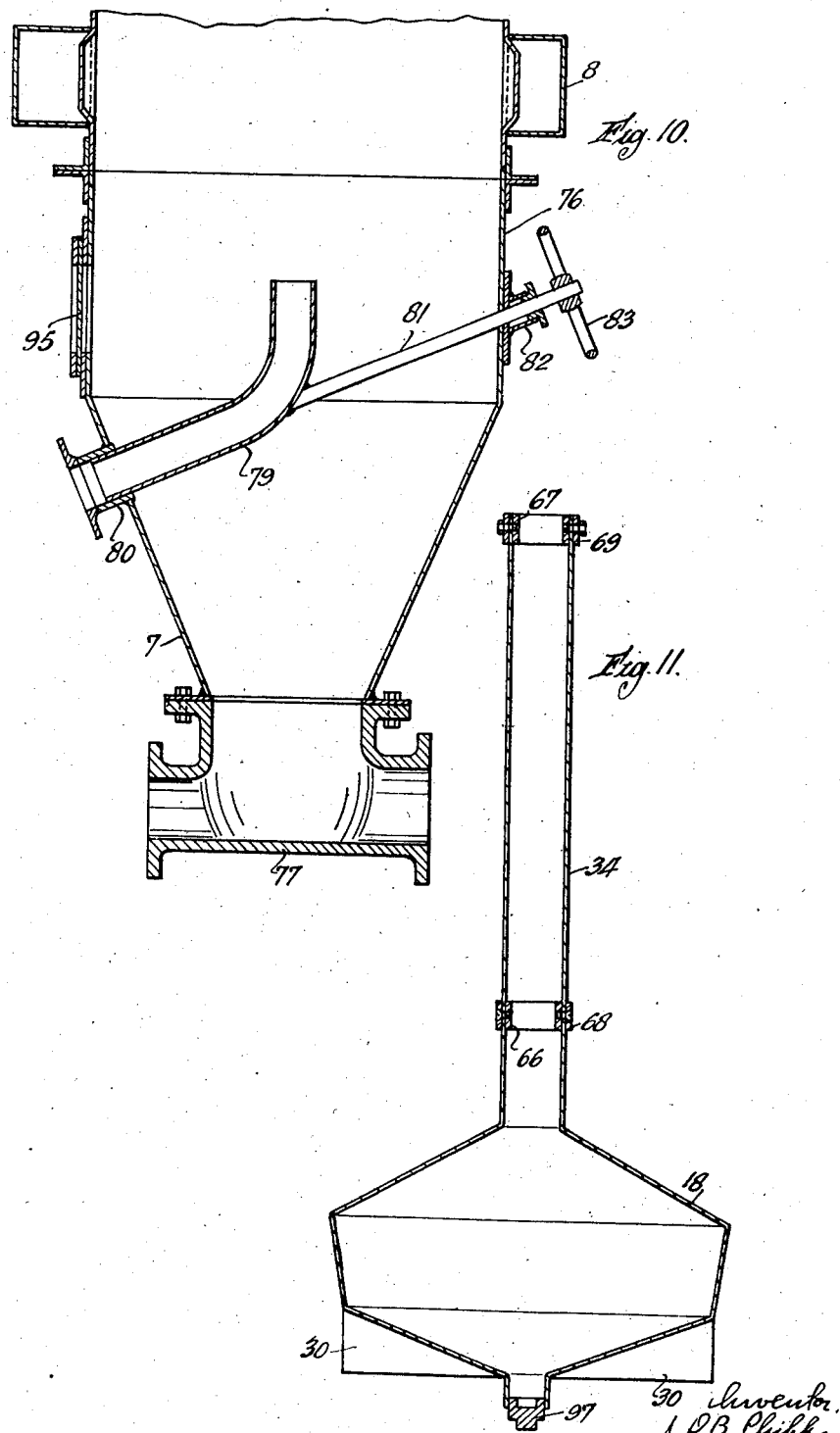

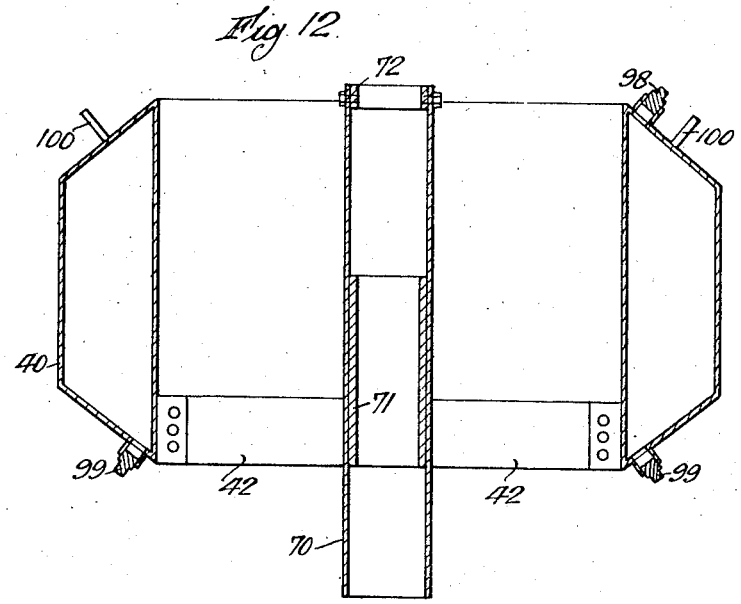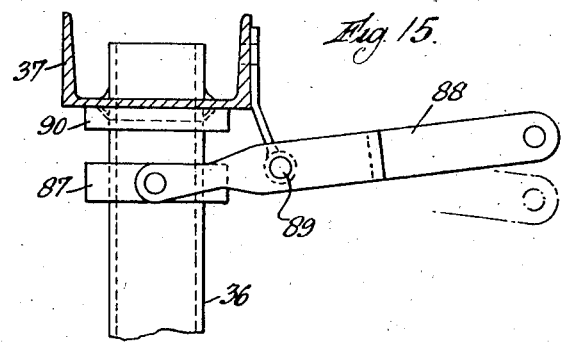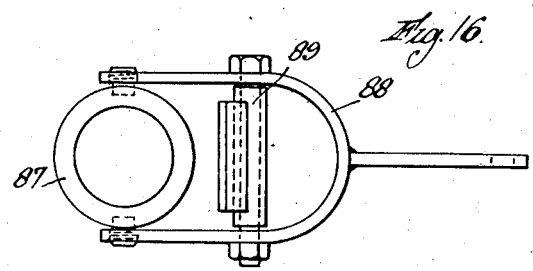

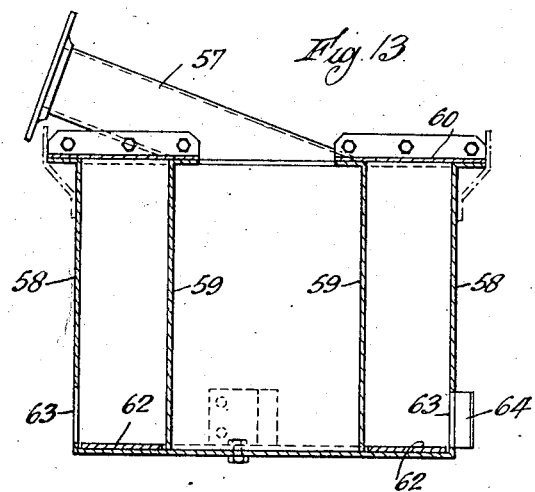
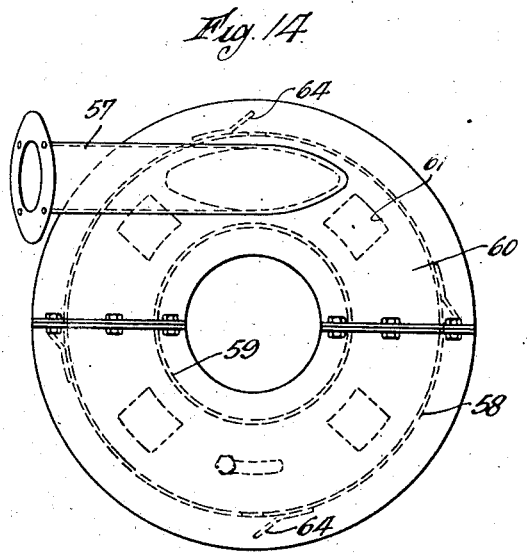

Patented Apr. 3, 1945

2,373,051

UNITED STATES PATENT OFFICE 2,373,051

LIQUID-OPERATED CLASSIFIER

John Degory Baron Phipps, London, England

Application June 21, 1944, Serial No. 541,444
In Great Britain June 11, 1943

14 Claims. (Cl. 209—160)

The invention relates to classifiers of the hindered settling type. In my British Patent No. 553,604 I describe a classifier of this type in which a sand pump for the removal of the coarse fraction was coupled direct to the bottom outlet and the clean water inlet was above the outlet, the upward current for classifying being produced above the clean water inlet. A body termed a floating cone was adapted to float submerged at a varying level in the upward current of liquid and the classifier casing was tapered to increase in width upwards and vary the flow cross-section according to the height of the floating cone.

It is an object of the present invention to make a classifier of the kind referred to suitable for material of varying average particle size without changing the size at which split takes place.

It is a further object to provide means for varying the physical composition of the coarse fraction produced by abstracting an adjustable proportion of a selected range of grain sizes. This variation of physical composition is required in certain cases to make naturally occurring sands suitable for first class concrete work.

The first object is achieved by having a second floating body, referred to as a compensating float or cone, cooperating with the floating cone to provide a second classifying column. For attaining the second object a second sand pump has its suction terminating in the column of liquid flowing down with a swirling motion between the clean water inlet and the outlet to the first pump, the position of the suction end being adjustable to varying disances from the outside wall.

Figure 8:
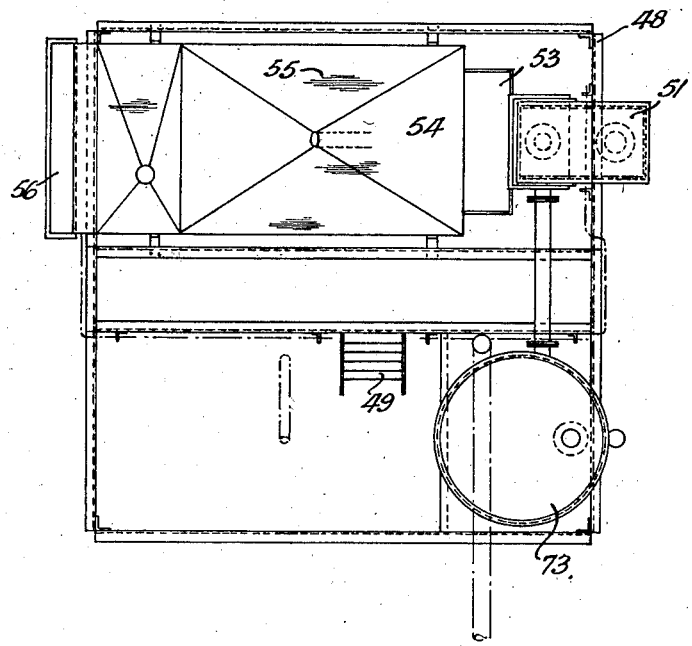
Figure 2:
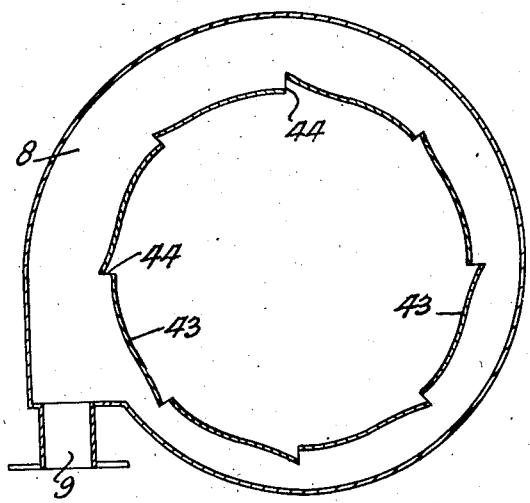
Figure 3:
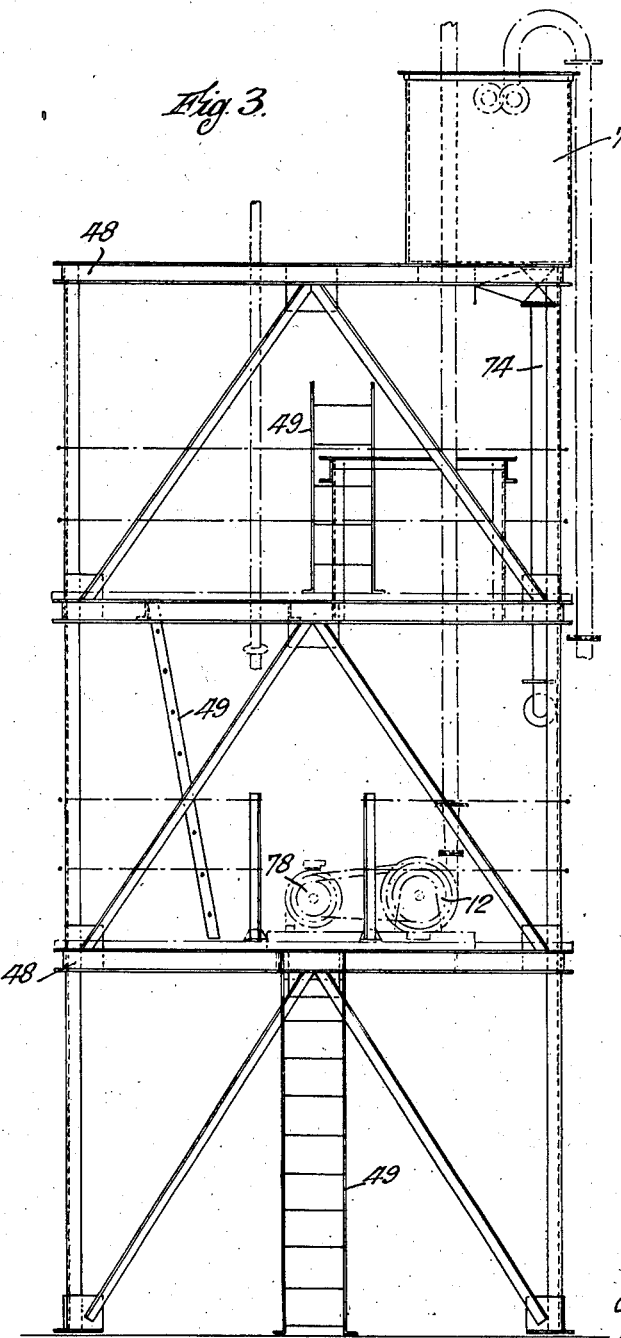
Figure 4:
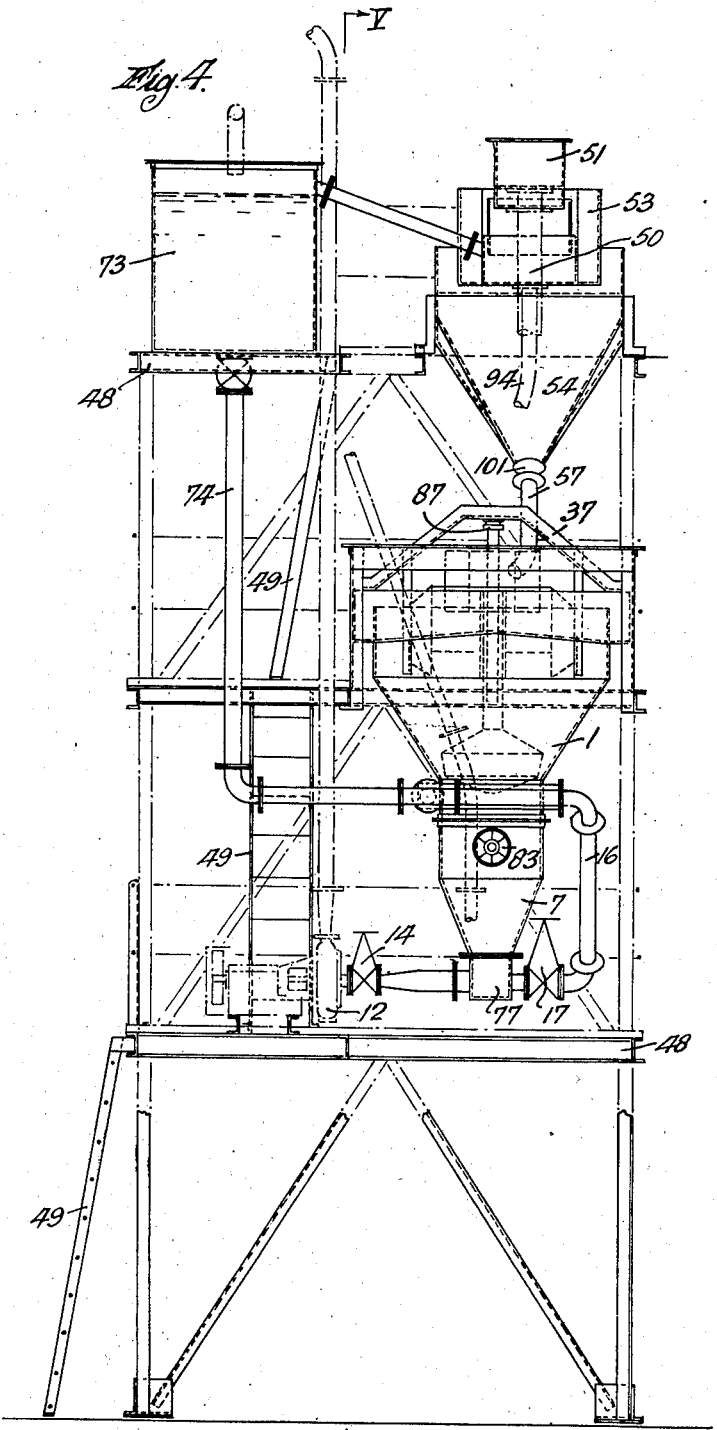
Figure 5:
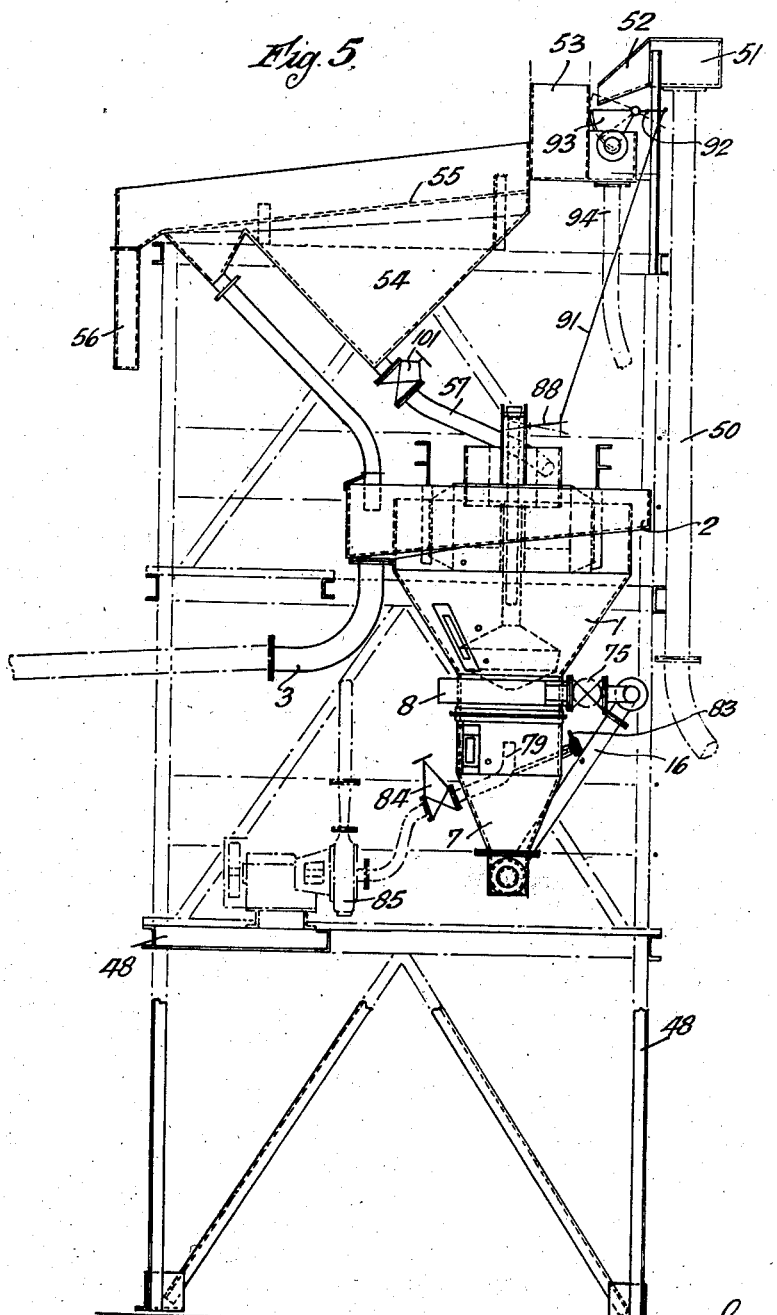
Figure 6:
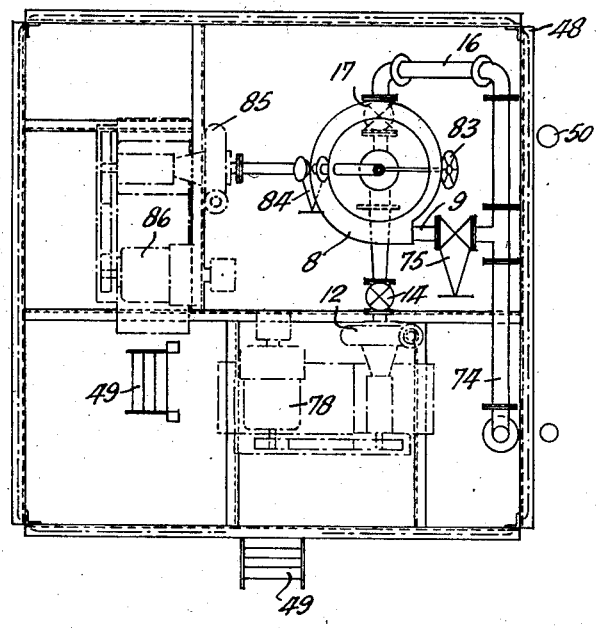
Figure 7:
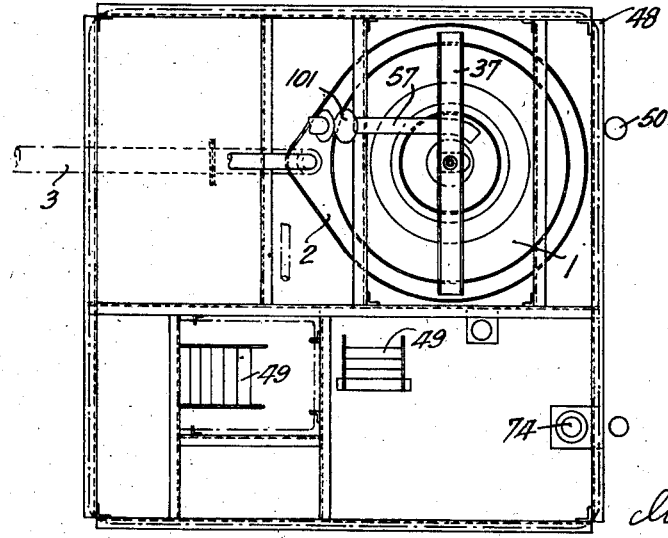

Further features of the invention will be apparent from the description now to be given of two forms of construction for washing sand and gravel illustrated in the accompanying drawings, in which Figure 1 is an elevation partly in section of one form of classifier, Figure 2 is a sectional plan on the line II—II of Figure 1, Figure 3 is a front elevation of another form of classifier with its ancillary apparatus, Figure 4 is a side elevation of the same, Figure 5 is a sectional elevation on the line V—V of Figure 4, Figure 6 is a sectional plan taken on the first floor of the structure, Figure 7 is a sectional plan taken on the second floor, Figure 8 is a top plan, Figure 9 is a sectional elevation of the upper part of the classifier alone without the overflow launder, Figure 10 is a corresponding view of the lower part, Figure 11 is a sectional elevation of the floating cone, Figure 12 is a sectional elevation of the compensating cone, Figure 13 is an elevation and Figure 14 a plan of the feed inlet, and Figure 15 is an elevation and Figure 16 a plan of the overload device.

Referring to Figures 1 and 2, the body of the classifier is in the form of an inverted cone 1 with cylindrical upper part and is hereinafter referred to as the static cone. An annular overflow trough 2 surrounds the top and discharges the waste water with the slimes into a pipe 3. The feed is delivered by a helical launder or pipe 4 so as to cause a swirl for a purpose to be mentioned later. A conical sand chamber 7 is mounted below the static cone 1 with an intervening spiral chamber or volute 8, to which clean water can be admitted at 9 for washing the sand. An outlet pipe 11 close to the apex or bottom of the sand chamber 7 leads to a sand pump 12 shown in conventional form.

Inside the static cone 1 a body 18 is placed so as to be completely submerged during normal operation. The shape of this body in the form shown in the drawings is a cylinder with a cone on each end face. I prefer to call this body the floating cone. The floating cone 18 is fixed in a water-tight manner to the lower end of a tube 34 extending well above the liquid level in the static cone and provided with two internal bearing bushes 35, 35. A smaller vertical tube 36 is fixed by a channel iron 37 to the static cone 1 and acts as journal for the bearings 35. A collar 38 at the lower end of the tube 36 serves as a stop to limit the downward movement of the tube 34 and cone 18, and an upper collar 39 similarly limits the upward movement.

Attached to the floating cone 18 is a compensating float 40. This is an annular hollow body in the shape of a cylinder with a frustum of a cone on each end face. The compensating float 40 is bolted at an adjustable height to a cylinder 41 fixed by four vanes 42, 42 to the tube 34. The vanes 42 are vertical, so that the swirl of the incoming feed at 4 keeps the whole structure 18, 34 and 40 in slow rotation. This gives a more sensitive response in floating level of the structure to the conditions of the material within the static cone as will be further explained later.

It also assists in keeping the upward current uniform at all peripheral positions. Moreover, the flat vanes cause minimum obstruction to the falling material.

Figure 1 shows the floating cone and compensating float in their highest position. The chain dotted lines on the right hand side represent the portions of these elements defining the flow channels with the static cone when they are in their lowest position.

The volute 8 has an inner wall 43 with eight equal inlet ports 44, 44 to give an even peripheral distribution of the incoming clean water. The swirl from the volute 8 should, of course, be in the same direction as that from the helical launder 4.

The static cone 1 is provided with a window 45 by which the operator can observe the behaviour of the material being treated. The top edge of the static cone 1 forms a weir for discharge into the overflow trough 2. This edge is made adjustable in height by means of an external ring 46 bolted to it. An adjustment of 2 inches each way from the mid position will probably be found sufficient.

The floating cone 18 is made hollow with access to the interior by means of the tube 36, so that the cone can have a suitable quantity of concrete or sand placed in it to adjust the weight nearly to the correct value. The addition of such material helps to keep the centre of gravity of the structure low. Alternatively the floating cone could be made of concrete. The tube 34 carries near the top a weight box 47 into which weights can be put for the final adjustment of weight of the structure 18, 34 and 40 to suit the required conditions.

The principal function of the floating cone is to regulate the velocity of the upward current between it and the static cone to an approximately constant value whatever the rate of feed. By floating on the rising current the cone will rise with any increase of current until equilibrium is established between its apparent weight and the dynamic effect of the upward current. Similarly a decrease in the upward current will cause the cone to fall. The flow velocity thus remains the same and the split is effected at the same particle size.

The effect described in the immediately preceding paragraph is the same as in the apparatus of my prior invention referred to above, but the compensating float 40, which is additional thereto, has the purpose of keeping the split at the same particle size even when the proportion of particles in the raw material above and below that size varies, as will now be explained.

Supposing that a split is required at 100 mesh, the top of the static cone 1 is made of such a diameter that the vertical velocity of the dirty water rising to the overflow is equal to that of a sand grain 100 mesh in size falling in a stationary mixture which is of equal specific gravity to that which is overflowing. By this means the size of grains overflowing should be limited to those smaller than 100 mesh. The weights in the weight box 47 are then adjusted so that the velocity of the water rising in the constriction between the floating cone 18 and the static cone 1 is equal to that of a sand grain of 100 mesh in size falling in a stationary mixture which is of equal specific gravity to that in the constriction. There is, of course, a considerable difference between these two specific gravities and velocities, but just as the size of grains overflowing would be limited to those smaller than 100 mesh (usually called "—100 mesh grains") so also those falling would be limited to those larger than 100 mesh (usually called "+100 mesh grains").

Under these conditions an exact split at 100 mesh would be obtained provided that their average falling velocities remained constant.

Suppose now that due to a change in the composition of the sand the average falling velocity increased to such an extent that the upward current corresponded to that of a grain of 80 mesh falling in a stationary mixture of the same specific gravity, no —80 mesh grains would fall.

This would cause an accumulation of grains between 80 and 100 mesh (usually called "—80 +100 mesh") which could go neither up nor down.

These could only accumulate under the compensating float 40 thereby increasing the specific gravity of the mixture there and causing the float to rise, and at the same time to lift float 18 to such an extent that the upward current at the constriction would be reduced until grains down to 100 mesh could fall. Equilibrium would be re-established, and the split would take place once more at 100 mesh. As the static cone 1 is stationary, the compensating float 40 in rising has increased the gap between itself and the inner surface of the static cone immediately under it. This would reduce the velocity of the rising current in the gap and, until a corresponding increase in the specific gravity of the mixture there takes place, grains between 100 and 120 mesh would be unable to rise. In being unable to rise they would themselves create this corresponding increase in specific gravity which would cause an "unwanted" rise in the compensating float.

It is to correct this tendency that the upper part of the compensating float is made to emerge from the water. The loss of buoyancy resulting is made to balance out the effect of this unwanted secondary accumulation of grains. Looked at in another way, the action of the compensating float corresponds to the automatic removal of weights from the weight box 47 when the average falling velocity increases.

Referring now to Figures 3 to 16, the static cone 1 is of the same general shape as before and is shown in Figures 4 and 5 mounted on a three-storey frame 48 of constructional ironwork with access ladders 49 to the various floors. The principal differences from the classifier previously described are that the compensating float is movable independently of the floating cone and that a second pump is provided to abstract some of the clean sand on its way to the said cone.

The sand to be cleaned is raised by a said pump (not shown) through a pipe 50 into a boiling box 51. From here it flows by a chute 52 into a secondary tank 53, which discharges into a static tank 54 of inverted pyramidal form. The material enters the static tank 54 through a wedge wire screen 55 set on the slope. The oversize stones retained by the screen pass out through a stone chute 56. The wedge wire screen may be replaced by a vibrating screen if the quantity of oversize stones warrants it.

From the apex (bottom) of the static tank a pipe 57 leads to the feed inlet, of which details are shown in Figures 13 and 14. The feed inlet is suspended on the channel iron 31 and comprises a cylindrical box 58 with inner cylinder 59 to form an annular water space of rectangular section. The top plate 60 is made in halves and the feed pipe 57 enters one half tangentially as viewed in plan and with a 20° downward slope to produce a swirl in the water space.

Four square holes 61, 61 are equally spaced in the bottom plate, and a loose plate 62 with corresponding holes overlies the bottom plate. The loose plate 62 can be adjusted in position to vary the effective aperture of the holes 61, 61. In the outer cylinder 58 there are also four rectangular ports 63, 63 staggered in relation to the holes 61, 61. A diverting plate 64 is fitted over each port 63 to assist in maintaining the swirl of the material issuing therefrom. The tops of the ports 63 are below the water level determined by the annular overflow 2. The combination of adjustable holes and ports makes it possible to regulate the centrifugal velocity of the suspension entering the static cone to suit the conditions.

The channel iron 37 as before carries a fixed vertical tube 36 to serve as a bearing for the supports of the floats. The tube 36 is polished on the outside and carries a ring 65 for supporting the floats when the static cone is empty. The floating cone 18 has a tubular shaft 34 with an internal ring 66 near the bottom to serve as a bearing bush and an internal ring 67 at the top, which serves as a bearing bush and also engages the ring 65 when the static cone is empty. Upward movement of the floating cone is limited by the channel iron 37.

The tube 34 is likewise polished on the outside and has external rings 68 near the bottom and 69 at the top. A third tube 70 carries the compensating float 40 by means of vertical vanes 42. The tube 70 has an internal bearing bush 71 of rubber or lignum vitae and an internal ring 72 at the top. The vertical movement of the compensating float 40 in relation to the floating cone 18 is limited in the upward direction by contact of the ring 72 with the ring 69 and in the downward direction by contact of the lower end of the bearing 71 with the ring 68. The tube 70 is carried down well below the bearing bush 71 to keep the bearing free from sand as far as possible.

The top edge of the static cone 1 is provided with a ring 46 of adjustable height to form a weir plate. The parts are so dimensioned that in every operating position of the weir plate 46 and the compensating float 40 the water level in the static cone 1 is on the cylindrical part of the float 40. In this respect the present construction differs from that of Figure 1, where the water level was on the upper conical surface of the float 40.

Clean water for washing the sand is supplied from a tank 73 on the top of the framework 48, passing down by a pipe 74 through an adjusting valve 75 to the inlet 9 of the clean water volute 8. The form of the volute is as shown in Figure 2. A certain proportion of the water fed in at the volute 8 passes upwards through the annular constriction between the static cone 1 and the floating cone 18 and classifies the material in a sorting column thereabove on the hindered settling principle. The floating cone in the present form has its middle part carried with the apex downwards, so that the specific gravity of the suspension in the sorting column may exert some effect on the cone. Vanes 30 on the under side of the floating cone help to keep the cone in slow rotation due to the swirl.

The sand cone 7 is attached to the volute 8 in the present case by a cylindrical portion 76 and terminates in a T piece 77. The sand pump 12, driven by a motor 78, is connected to one branch of the T piece 77 through a main suction valve 14.

A by-pass pipe 16 with a valve 17 connects the water inlet for the volute 8 to the other branch of the T piece 77. This provides additional means of adjustment of the clean water supply to the volute 8. A choke in the pump suction due to faulty operation can be cleared by opening the valve 17 and closing the valve 75, allowing the pump 12 to remove the said.

A bent suction pipe 79 passes through the conical wall of the sand chamber 7 by a screwed socket 80 in which it can turn freely. A shaft 81 in line with the part of the pipe 79 passing through the chamber wall is fixed to bend and passes through the wall of the cylindrical portion 76 by a gland 82. A hand wheel 83 is fixed to the shaft on the outside. In the position shown in figure 10 the inner end of the pipe 79 is central and vertical. By means of the hand wheel 83 the pipe 79 can be moved to bring its open end near the wall of the sand cone 7 to any intermediate position between that and the central position shown. One spoke of the hand wheel has an arrow cast on it to act as an index. This is the spoke in line with the upper end of the pipe 79 when viewed along the axis of the shaft 81.

The outer end of the pipe 79 is connected through a valve 84 to a second sand pump 85 driven by a motor 86. The pump 85 abstracts some of the sand falling in the sand cone 7. The swirl in the sand cone gives rise to a radial grading of the falling sand particles. In the position of Figure 10 the abstracted particles are those at the centre and in the other extreme position those near the outside, while in intermediate positions particles of intermediate ranges are abstracted. The quantity abstracted can be adjusted by means of the valve 84, but adjustment should not be made during operation.

The classifier may have to operate with varying feed and will take care of variations up to full load. In case the feed should increase still further, it is desirable to have an overload device. For this purpose a ring 87 is mounted to slide on the vertical tube 34. It is supported by the forked end of a lever 88 pivoted at 89 on a bracket attached to the channel iron 37. Normally the ring is about an inch below a stop ring 90 attached to the channel iron 37. When on account of an increase in load the floating cone 18 rises, its top rings 67 and 69 just reach the ring 87 at the full load position.

The outer end of the lever 88 is connected by a tie rod 91 to a lever 92 carrying a cut off gate 93. When the gate rises, it cuts into the stream of sand and water flowing from the chute 52 into the tank 53. The material so diverted passes to a return pipe 94, from which it flows back to the supply. The amount so diverted is dependent on the extent to which the gate 93 rises and accordingly on the rise of the floating cone 18.

For the purpose of observing the operation the static cone 1 is provided with two inspection windows 95, 95 above and below the clean water volute 8. In addition three pipe sockets 96, 96 are fitted in the positions shown to receive flexible rubber connections for vertical gauge glasses. The height to which clear water will rise in these glasses above the level in the static cone indicates the specific gravities of the mixture at the different points.

The weight of the floating cone 18 can be adjusted by pouring sand or water down the supporting tube 34. A plug 97 is provided at the bottom of the floating cone, by which the water or sand can be removed, if the weight is to be reduced. The compensating float 40 can have its weight adjusted by adding water through a plug hole 98 or removing it through plug holes 99, 99. A central weight box would obstruct the inlet box, but pegs 100, 100 are attached to the compensating float, upon which weights can be hung.

In operation the speeds of the two pumps and their valve settings should remain constant at their adjusted values. Before any sand is fed in a balance should be struck between the quantity of clean water flowing in by the volute 8 and that being removed by the pumps 12 and 85. The opening of the valve 84 and the position of the suction bend are adjusted in accordance with the known physical analysis of the sand to be treated and the change of composition required. When both pumps are running, the static cone 1 should remain brim full or overflow very slightly. Then, when sand and dirty water are fed in, the sand itself causes its own upward current by displacement in direct proportion to the quantity of sand fed in. The feed of dirty sand and water should be kept approximately constant in bulk, however, the sand content may vary. This is effected automatically by the static tank 54, feed pipes 57 and valve 101.

The floating cone 18 and the compensating float or cone 40 each have a lower conical surface cooperating with the interior conical surface of the static cone 1 to form a lower and an upper sorting column respectively. Figure 9 shows both cones 18 and 40 at their highest positions on the left hand side and at their lowest positions on the right hand side. In the case of both sorting columns the cross-section is not the same at all levels, and in most positions there is a maximum cross-section somewhere in the column with a gradual reduction both upwards and downwards.

This feature was originally considered to be a drawback which should be avoided, but the present invention makes use of it. As classification proceeds there is a gradual accumulation of grains of a size very near the split, which cannot go up or down, because the flow velocity is a maximum at the lower part of the sorting column between the floating cone 18 and the static cone 1 and diminishes in the upward direction. This accumulation increases the effective specific gravity of the sand and water mixture and exerts increased pressure on the middle conical part of the floating cone 18, causing it to rise. The reduced flow velocity due to the increased cross-section permits a considerable proportion of the grains so accumulated to pass down to the sand chamber 7. The reduced effective specific gravity in the sorting column then allows the floating cone 18 to fall a little, and the process commences again. A rather similar effect takes place in the upper sorting column between the compensating float 40 and the static cone 1.

At no load, that is with a minimum of water flowing upwards but with no sand fed in, both cones 18 and 40 will be at their lowest position as shown on the right hand side of Figure 9. As the feed of sand increases from zero, both cones rise independently of each other to equilibrium positions dependent on the rate of feed. At some point dependent on the slit or mud content of the dirty sand the floating cone 18 overtakes the compensating cone 40, and the outer ring 88 on the tube 34 comes into contact with the lower end of the bearing bush 71. From that point to full load the two cones move together as one structure.

There is a difference in operation between the two sorting columns, as will now be explained, but the periodic accumulation of grains near the split size occurs in both. In the lower sorting column between the floating cone 18 and the lower part of the static cone 1 the conditions are those of true hindered settling, since the quantity of sand falling in the whole output of cleaned sand and the rising current of water is equivalent in bulk to the sand falling, as explained above.

The rising current in the upper sorting column between the compensating cone 40 and the upper part of the static cone 1 is made up of the water rising from the lower sorting column and the water supplied with the feed of dirty sand. The latter quantity is considerably larger than the former; it may be four times as much at full load and an even greater proportion at lower loads. The solids in this sorting column are only the silt rising to the overflow and a few sand grains near the split size, a much smaller quantity than in the lower sorting column. The conditions are therefore practically those of free settling.

The respective flow velocities should be regulated in acordance with these differing settling conditions, that is, the vertical velocity of flow in the upper sorting column should be considerably faster in feet per minute than in the lower one to achieve split at the same particle size. The lower conical face of the compensating float 40 should be of such a shape that, when the float is half way between its extreme upper and lower positions, the vertical component of the velocity of flow between it and the upper conical part of the static cone 1 is equal to the vertical velocity of the water in the space above bounded by the cylindrical parts of the float 40 and the static cone 1.

It may in some cases be desirable to have the compensating float 40 rigidly attached to the floating cone 18 as in the case of Figure 1. For this purpose set screws may be passed through the ring 7 into the tube 34.

The classifier of Figures 1 and 2 can be mounted with its ancillary apparatus on a structure like 48 for convenient access and operation.

What I claim is:

1. A classifier of the hindered settling type comprising a static cone with its apex downwards and its top open for the overflow of the finer fraction, a feed inlet at the top for water containing in suspension the material to be classified, a clean water inlet at the lower end of the static cone, a body located to float submerged at a variable level in the lower part of the static cone and to define between itself and the static cone a hindered settling column of variable cross-section, a second body located to float partly submerged at a variable level in the upper part of the static cone and to define between itself and the static cone a classifying column of variable cross-section, a sand chamber below the clean water inlet to collect the coarser fraction, and a pump connected to the sand chamber to remove water with the coarser fraction in suspension.

2. A classifier of the hindered settling type comprising a static cone with its apex downwards and its top open for the overflow of the finer fraction, a feed inlet at the top for water containing in suspension the material to be classified, a clean water inlet at the lower end of the static cone, a body located to float submerged at a variable level in the lower part of the static cone and to define between itself and the static cone a hindered settling column of variable cross-section, a second body attached to the aforesaid body to move in unison therewith and located to float partly submerged at a variable level in the upper part of the static cone and to define between itself and the static cone a classifying column of variable cross-section, a sand chamber below the clean water inlet to collect the coarser fraction, and a pump connected to the sand chamber to remove water with the coarser fraction in suspension.

3. A classifier of the hindered settling type comprising a static cone with its apex downwards and its top open for the overflow of the finer fraction, a feed inlet at the top for water containing in suspension the material to be classified, a clean water inlet at the lower end of the static cone, a body located to float submerged at a variable level in the lower part of the static cone and to define between itself and the static cone a hindered settling column of variable cross-section, a second body located in the upper part of the static cone to float partly submerged at a variable level independent at least in part of the floating level of the first body and to define between itself and the static cone a classifying column of variable cross-section, a sand chamber below the clean water inlet to collect the coarser fraction, and a pump connected to the sand chamber to remove water with the coarser fraction in suspension.

4. A classifier of the hindered settling type comprising a static cone with its apex downwards and its top open for the overflow of the finer fraction, a feed inlet at the top for water containing in suspension the material to be classified, a clean water inlet at the lower end of the static cone, a body located to float submerged at a variable level in the lower part of the static cone and to define between itself and the static cone a hindered settling column of variable cross-section, a second body of annular form located to float partly submerged at a variable level in the upper part of the static cone and to define between itself and the static cone a classifying column of variable cross-section, the feed inlet being arranged to discharge the material inside the said second body, a sand chamber below the clean water inlet to collect the coarser fraction, and a pump connected to the sand chamber to remove water with the coarser fraction in suspension.

5. A classifier of the hindered settling type comprising a static cone with its apex downwards and its top open for the overflow of the finer fraction, a feed inlet at the top for water containing in suspension the material to be classified, a clean water inlet at the lower end of the static cone, a tubular shaft fixed in relation to the static cone and projecting vertically downwards at the centre thereof, a second tubular shaft embracing the first and movable vertically in relation thereto, a body attached to the lower end of the second tubular shaft to float submerged in the lower part of the static cone and to define between itself and the static cone a hindered settling column of variable cross-section, cooperating abutments on the outside of the first tubular shaft and the inside of the second to limit the vertical movement of the second tubular shaft and the floating body, a second body located to float partly submerged at a variable level in the upper part of the static cone and to define between itself and the static cone a classifying column of variable cross-section, a sand chamber below the clean water inlet to collect the coarser fraction, and a pump connected to the sand chamber to remove water with the coarser fraction in suspension.

6. A classifier as defined in claim 5 in which the second floating body is fixed to the second tubular shaft by means permitting adjustment of the relative heights of the two floating bodies.

7. A classifier of the hindered settling type comprising a static cone with its apex downwards and its top open for the overflow of the finer fraction, a feed inlet at the top for water containing in suspension the material to be classified, a clean water inlet at the lower end of the static cone, a tubular shaft fixed in relation to the static cone and projecting vertically downwards at the centre thereof, a second tubular shaft embracing the first and movable vertically in relation thereto, a body attached to the lower end of the second tubular shaft to float submerged in the lower part of the static cone and to define between itself and the static cone a hindered settling column of variable cross-section, cooperating abutments on the outside of the first tubular shaft and the inside of the second to limit the vertical movement of the second tubular shaft and the floating body, a third tubular shaft embracing the second and movable vertically in relation thereto, a second body fixed to the third tubular shaft at a level to float partly submerged and to define between itself and the static cone a classifying column of variable cross-section, cooperating abutments on the outside of the second tubular shaft and the inside of the third to limit the vertical movement of the third tubular shaft in relation to the second, a sand chamber below the clean water inlet to collect the coarser fraction, and a pump connected to the sand chamber to remove water with the coarser fraction in suspension.

8. A classifier of the hindered settling type comprising a static cone with its apex downwards and its top open for the overflow of the finer fraction, a feed inlet at the top for water containing in suspension the material to be classified, a clean water inlet at the lower end of the static cone, a tubular shaft fixed in relation to the static cone and projecting vertically downwards at the centre thereof, a second tubular shaft embracing the first and movable vertically in relation thereto, a body attached to the lower end of the second tubular shaft to float submerged in the lower part of the static cone and to define between itself and the static cone a hindered settling column of variable cross-section, cooperating abutments on the outside of the first tubular shaft and the inside of the second to limit the vertical movement of the second tubular shaft and the floating body, a third tubular shaft embracing the second and movable vertically in relation thereto, a body of annular form fixed to the third tubular shaft at a level to float partly submerged and to define between itself and the static cone a classifying column of variable cross-section, the feed inlet being arranged to discharge the material inside the said annular body, cooperating abutments on the outside of the second tubular shaft and the inside of the third to limit the vertical movement of the third tubular shaft in relation to the second, a sand chamber below the clean water inlet to collect the coarser fraction, and a pump connected to the said chamber to remove water with the coarser fraction in suspension.

9. A classifier of the hindered settling type comprising a static cone with its apex downwards and its top open for the overflow of the finer fraction, a tangential feed inlet at the top for water containing in suspension the material to be classified, a clean water inlet volute at the lower end of the static cone having the same direction of swirl as the said feed inlet, a tubular shaft fixed in relation to the static cone and projecting vertically downwards at the centre thereof, a second tubular shaft embracing the first and movable vertically in relation thereto, a body attached to the lower end of the second tubular shaft to float submerged in the lower part of the static cone and to define between itself and the static cone a hindered settling column of variable cross-section, cooperating abutments on the outside of the first tubular shaft and the inside of the second to limit the vertical movement of the second tubular shaft and the floating body, a second body located to float partly submerged at a variable level in the upper part of the static cone and to define between itself and the static cone a classifying column of variable cross-section, vanes in vertical planes associated with at least one of the floating bodies to keep both bodies in slow rotation due to the swirl in the liquid, a sand chamber below the clean water inlet to collect the coarser fraction, and a pump connected to the sand chamber to remove water with the coarser fraction in suspension.

10. A classifier of the hindered settling type comprising a static cone with its apex downwards and its top open for the overflow of the finer fraction, a tangential feed inlet at the top for water containing in suspension the material to be classified, a clean water inlet volute at the lower end of the static cone having the same direction of swirl as the said feed inlet, a body located to float submerged at a variable level in the lower part of the static cone and to define between itself and the static cone a hindered settling column of variable cross-section, a second body located to float partly submerged at a variable level in the upper part of the static cone and to define between itself and the static cone a classifying column of variable cross-section, a sand chamber of at least partly conical form below the clean water inlet volute to collect the coarser fraction, a pump connected to the apex at the bottom of the sand chamber to remove water with the coarser fraction in suspension, a second pump for removal of water with suspended solids, a suction pipe for the second pump protruding into the sand chamber, means for moving the inlet end of the said suction pipe to varying distances from the axis of the sand chamber, and means for adjusting the quantity of liquid drawn off by the second pump.

11. A classifier of the hindered settling type comprising a static cone with its apex downwards and its top open for the overflow of the finer fraction, a feed inlet at the top for water containing in suspension the material to be classified, a clean water inlet at the lower end of the static cone, a body located to float submerged at a variable level in the lower part of the static cone and to define between itself and the static cone a hindered settling column of variable cross-section, a second body located to float partly submerged at a variable level in the upper part of the static cone and to define between itself and the static cone a classifying column of variable cross-section, a sand chamber below the clean water inlet to collect the coarser fraction, a by-pass pipe between the clean water inlet and the pump, a regulating valve in the by-pass pipe, and a second regulating valve between the commencement of the by-pass pipe and the clean water inlet.

12. A classifier as defined in Claim 7 in which the first floating body is in the form of an upper upright cone and a lower inverted cone with an intermediate trunco-conical portion having its apex downwards and of a smaller vertical angle than the lower inverted cone, and in which the second floating body is in the form of an inner cylinder and an outer cylinder joined at the top by an upright truncated cone and at the bottom by an inverted truncated cone, the said body being mounted on the third shaft in such a position that the body floats with the water level in the static cone on the outer cylindrical surface of the said body in every operation position.

13. A classifier of the hindered settling type comprising a static cone with its apex downwards and its top open for the overflow of the finer fraction, a clean water inlet at the lower end of the static cone, a body located to float submerged at a variable level in the lower part of the static cone and to define between itself and the static cone a hindered settling column of variable cross-section, a second body of annular form located to float partly submerged at a variable level in the upper part of the static cone and to define between itself and the static cone a classifying column of variable cross-section, a feed inlet box bounded by inner and outer cylindrical faces and upper and lower annular flat faces located with its lower end within the upper part of the said annular floating body, a tangentially directed inlet pipe terminating in the upper flat face for water containing in suspension the material to be classified, discharge holes of variable aperture in the lower flat face, outlet ports in the outer cylindrical face of the feed box, diverting plates over the ports set at an angle to the cylindrical face to agree with the swirl due to the tangential inlet pipe, a sand chamber attached to the static cone below the clean water inlet to collect the coarser fraction, and a pump connected to the sand chamber to remove water with the coarser fraction in suspension.

14. A classifier as defined in claim 5 including also an overload device, in which the overload device comprises a lever with its fulcrum fixed in relation to the static cone, a ring attached to one arm of the lever and embracing the fixed tubular shaft, the ring being normally at such a level as just to make contact with a member fast with the second floating body when the latter is at its full load position, and means connected to the other arm of the lever to divert when the ring is raised a portion of the water containing in suspension the material to be classified at some position prior to its entry into the feed inlet.

JOHN DEGORY BARON PHIPPS.